United States Patent [19]
Ikari et al.

[11] 3,944,431
[45] Mar. 16, 1976

[54] PLATE GRID IN USE FOR A PLATE FOR A LEAD STORAGE BATTERY

[75] Inventors: Shinichi Ikari, Kumagaya; Takumi Hayakawa, Honjoh; Yozo Kamikawa, Saitama; Fumito Imai, Suita, all of Japan

[73] Assignee: Keishin Matsumoto, Tokyo, Japan

[22] Filed: May 3, 1974

[21] Appl. No.: 466,729

[52] U.S. Cl. .................................. 136/36; 136/65
[51] Int. Cl.² .................................... H01M 35/04
[58] Field of Search ............ 136/36, 74, 65, 58, 57, 136/54, 48, 37–38, 60

[56] References Cited
UNITED STATES PATENTS

| | | | |
|---|---|---|---|
| 622,689 | 4/1899 | Howell | 136/60 X |
| 2,615,061 | 10/1952 | Brandt | 136/36 |
| 2,713,079 | 7/1955 | Carrick et al. | 136/57 X |
| 3,690,950 | 9/1972 | Wheadon et al. | 136/37 |

*Primary Examiner*—Anthony Skapars
*Attorney, Agent, or Firm*—Woodling, Krost, Granger & Rust

[57] ABSTRACT

A plate grid in use for a plate for a lead storage battery comprising a plurality of spaced longitudinal wire members each including a wire element of acid resisting material and a wire element of electrically conductive material selected from a group consisting of lead and lead alloy wound around said acid resisting wire element. A collector of electrically conductive material similar to that of said electrically conductive wire element is provided which is attached to one of the ends of said longitudinal wire members so that said collector is electrically connected to said electrically conductive wire elements of said longitudinal wire members.

7 Claims, 4 Drawing Figures

PLATE GRID IN USE FOR A PLATE FOR A LEAD STORAGE BATTERY

BACKGROUND OF THE INVENTION

A plate grid in use for a plate for a lead storage battery is conventionally formed of lath molded from lead or lead alloy. In order to improve the effectiveness of the lead storage battery, it is required to reduce the thickness and weight of the plate grid and to provide increased deposit of active material to the plate grid so that the battery plates can have a great capacity. However, at present the molding techniques have limited the reduction in the thickness and weight of the grid plate and therefore, the conventional grid plates cannot improve the effectiveness of the lead storage battery. More particularly, lead itself has relatively larger weight and the reduction in the thickness of the plate grid has been limited in consideration of its molding. Due to the larger thickness of the plate grid, a battery case of a given capacity can only have a limited number of plates contained therein, resulting in limitation in the electrical capacity of the lead storage battery. Also, due to the larger weight of the plate grid, the battery can only have less density of energy.

OBJECT OF THE INVENTION

Accordingly, it is a principal object of the present invention to provide a plate grid in use for a plate for a lead storage battery wherein the weight of the plate grid is substantially reduced to improve the effectiveness of the lead storage battery.

It is another object of the present invention to provide a plate grid in use for a plate for a lead storage battery wherein the thickness of the plate grid is substantially reduced to improve the effectiveness and also the capacity of the lead storage battery.

It is further object of the present invention to provide a method for preparing a plate grid in use for a plate for a lead storage battery wherein the plate grid of small weight and thickness can be readily fabricated.

SUMMARY OF THE INVENTION

In accordance with one aspect of the present invention, there is provided a plate grid in use for a plate for a lead storage battery comprising a plurality of spaced longitudinal wire members, said longitudinal wire members each including a wire element of acid resisting material and a wire element of electrically conductive material selected from a group consisting of lead and lead alloy, said electrically conductive wire element wound around said acid resisting wire element; and a collector of electrically conductive material selected from a group consisting of lead and lead alloy, said collector attached to one of the ends of said longitudinal wire members whereby said collector is electrically connected to said electrically conductive wire elements of said longitudinal wire members.

In accordance with another aspect of the present invention, there is provided a plate grid in use for a plate for a lead storage battery comprising a plurality of spaced longitudinal wire members, said longitudinal wire members each including a wire element of acid resisting material and a wire element of electrically conductive material selected from a group consisting of lead and lead alloy, said electrically conductive wire element wound around said acid resisting wire element; and a plurality of spaced latitudinal wire members of acid resisting material transversely attached onto said longitudinal wire members.

In accordance with another aspect of the present invention, there is provided a method for producing a plate grid in use for a plate for a lead storage battery, comprising the steps of preparing a plurality of wire elements of acid resisting material; preparing a plurality of wire elements of electrically conductive material selected from a group consisting of lead and lead alloy; winding each of said electrically conductive wire elements around each of said acid resisting wire elements to thereby provide a plurality of longitudinal wire members; preparing a plurality of latitudinal wire members of acid resisting material; and fabricating said longitudinal wire members together with said latitudinal wire members whereby a body of said plate grid is provided.

BRIEF DESCRIPTION OF THE DRAWING

The above and other objects and features of the present invention will become apparent from the description of the preferred embodiment taken with reference to the accompanying drawing in which.

DETAILED DESCRIPTION OF THE PREFERRED EMBODIMENT

Figure 1:
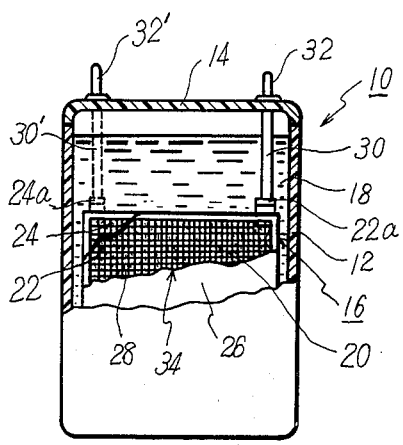
FIG. 1 is a front view of a lead storage battery in which plate grids according to the present invention are incorporated, with portions taken in section for purpose of illustration.

Referring now to FIG. 1 of the drawing, there is illustrated a lead storage battery designated generally at numeral 10 and comprising a molded case 12 which is formed of insulating and acid resisting material such as ebonite, polypropylene and the like with a cover 14 of similar material mounted on the top of the case 12 and secured thereto by any suitable means. The case 12 together with the cover 14 may have a plurality of cells defined by the case and partitions (not shown), one cell of which is shown in FIG. 1. Each of the cells comprises cell elements 16 including an electrolyte 18 of dilute sulfuric acid filled in the cell and a set of plates 20. The set of plates 20 comprise alternate positive and negative plates 22 and 24 spaced by separators 26 disposed between the adjacent positive and negative plates in a conventional manner. The positive and negative plates 22 and 24 each comprise a plate grid constructed according to the present invention on which an active material 28 in the form of paste is deposited by any suitable manner. A pair of poles 30 and 30' vertically extend from the collectors 22a and 24a of the respective plates 22 and 24 and through the cover 14 with the top ends protruded from the top face of the cover and constituting terminal posts 32 and 32' of positive and negative polarities.

Figure 2:
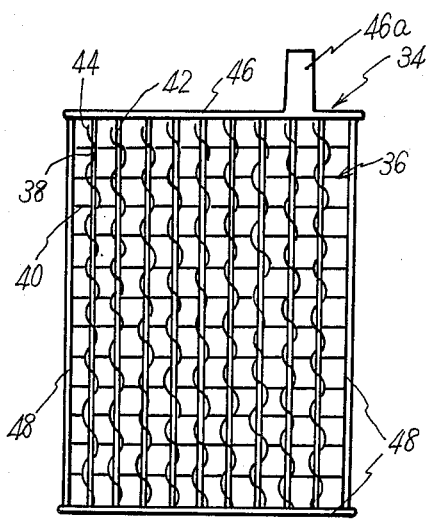
FIG. 2 is an enlarged front view of one embodiment of a plate grid in accordance with the present invention.
Figure 3:
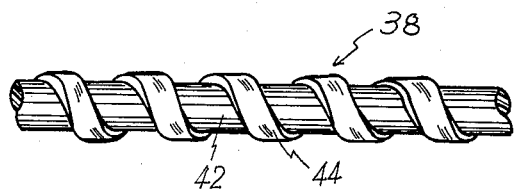
FIG. 3 is a further enlarged side elevational view of a portion of a wire member employed for the plate grid of FIG. 2.

FIG. 2 shows one embodiment of a plate grid 34 in accordance with the present invention and the plate grid 34 comprises a knitwork or woven member 36 including a plurality of longitudinal wire members 38 and a plurality of latitudinal wire members 40. As shown in FIG. 3, the longitudinal wire members 38 each comprise a wire element or filament 42 of acid resisting material such as metal of titanium or synthetic resin of polypropylene or polyester and a wire element or filament 44 of lead or lead alloy helically wound around the filament 42. In the illustrated embodiment, the filament 42 may have the rectangular cross section, but may alternatively have any other cross section, such as triangular or circular cross section. The acid resisting filament 42 may comprise fibre of approximately 0.5 mm in diameter and the lead or lead alloy filament 44 may have the thickness of approximately 0.3 mm and the width of approximately 0.7 mm. The latitudinal wire members 40 each comprise a filament of acid resisting material such as metal of titanium or synthetic resin of polypropylene or polyester as described in connection with the filament 42 of the longitudinal wire member 38. The adjacent longitudinal wire members 38 may have the distance between 0.3 and 5.0 mm depending upon the desired capacity of the storage battery 10. In the illustrated embodiment, the distance of the adjacent wire members 38 may be preferably 4.0 mm. The adjacent latitudinal wire members 40 may have the distance between 1.0 and 8.0 mm and in the illustrated embodiment the distance of preferably 7.0 mm. The woven member 36 can be readily fabricated by weaving the longitudinal and latitudinal wire members 38 and 40 in a conventional manner.

The plate grid 34 is provided with a collector 46 of lead or lead alloy securedly mounted on the top of the woven member 36 transversely of the longitudinal wire members 38. The collector 46 has a lug 46a integral with the collector 46. The collector 46 can be easily formed by casting it from lead or lead alloy on the top of woven member 36 in a conventional manner, for example, In order to prevent the woven member 36 from damage, the molten metal of lead or lead alloy may preferably have the temperature of 400°C to 500°C and the casting mold may preferably have the temperature of 100°C to 200°C.

The plate grid 34 is also provided with a framework 48 of synthetic resin such as polyester, for example, which is securedly mounted on the woven member 36 on both sides and at the bottom thereof. The framework 48 can be easily mounted on the woven member 36 by thermally adhering the former to the latter or alternatively by adhering it by adhesives.

A Table I shows the result of the comparison of the plate grid in accordance with the present invention with that constructed in a conventional casting process. In this comparison, the plate grid of the present invention and of the prior art had the same area, weight and thickness.

Table I

| | Capacity during initial discharge | Capacity after 50 cycles |
| --- | --- | --- |
| The plate grid of the prior art | 100 | 80 |
| The plate grid of the present invention | 110 | 100 |

In the above table, the numerical value are those obtained in the case where the capacity during initial discharge of the lead storage battery in which the plate grids of the prior art are incorporated is determined as the value of 100. As apparent from the Table I, the plate grid of the present invention is superior to that of the prior art in capacities both during initial discharge and after 50 cycles of charge and discharge.

The reason that the plate grid of the present invention is superior to that of the prior art is that the plate grid of the present invention can satisfactorily hold a paste of active material because the longitudinal wire members each have a rough surface at the periphery. It will be understood that a plate having the plate grid of the present invention can have greater capacity per unit weight than that having the plate grid of the prior art. It will be noted that the weight of a plate can be determined depending upon the specific gravities of the filaments 40 and 42 and upon the amount of lead or lead alloy used. It will be also noted that the capacity of the lead storage battery can be determined depending upon the distance between the adjacent longitudinal wire members of the plate grids used.

Figure 4:
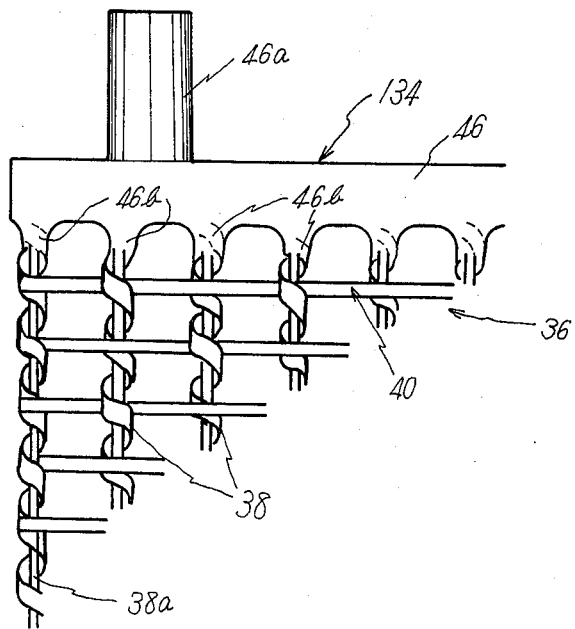
FIG. 4 is an enlarged front view of another embodiment of a plate grid in accordance with the present invention with portions broken away.

FIG. 4 shows in an enlarged scale another embodiment of a plate grid 134 in accordance with the present invention and the same components are designated by the same numerals. The plate grid 134 of FIG. 4 is substantially identical to the plate grid 34 of FIG. 2, but the vertical portions of the framework 48 of FIG. 2 are removed and the outermost longitudinal wire members 38a are located at both sides of the plate grid 134. The collector 46 of lead or lead alloy is provided with extensions 46b integral with the collector and surrounding the tops of the respective longitudinal wire members 38 and 38a so that the wire members are reinforced.

While some preferred embodiments of the present invention have been described in connection with the accompanying drawing, it is by way of illustration, but the present invention is not intended to be limited thereto. It will be understood that some changes and modifications in construction and arrangement might be made without departing from the spirit and scope of the present invention, which is defined only by the appended claims.

What is claimed is:

1. A plate grid for use in a plate for a lead storage battery comprising a woven member having a plurality of spaced latitudinal wire members of acid resisting material and a plurality of spaced longitudinal wire members which are woven together, said longitudinal wire members each including a wire element of acid resisting material and a wire element of electrically conductive material selected from a group consisting of lead and lead alloy, said electrically conductive wire element wound around said acid resisting wire element of said longitudinal wire member; and a collector of electrically conductive material selected from a group consisting of lead and lead alloy, said collector attached to one of the ends of said longitudinal wire members whereby said collector is electrically connected to said electrically conductive wire elements of said longitudinal wire members.

2. A plate grid as set forth in claim 1, wherein the spacing between adjacent longitudinal wire members falls within the range between 0.3 mm and 5.0 mm.

3. A plate grid as set forth in claim 1, wherein the spacing between adjacent latitudinal wire members falls within the range between 1.0 mm and 8.0 mm.

4. A plate grid as set forth in claim 1, wherein said acid resisting wire element is formed from metal.

5. A plate grid as set forth in claim 1, wherein said acid resisting wire element is formed from synthetic resin.

6. A plate grid as set forth in claim 1, wherein said acid resisting wire element of each of said longitudinal wire members and each of said latitudinal wire members are formed from metal.

7. A plate grid as set forth in claim 1, wherein said acid resisting wire element of each of said longitudinal wire members and each of said latitudinal wire members are formed from synthetic resin.

* * * * *